July 30, 1957 — C. W. STEWART — 2,800,977
DUST FILTER MEANS
Filed Jan. 14, 1954
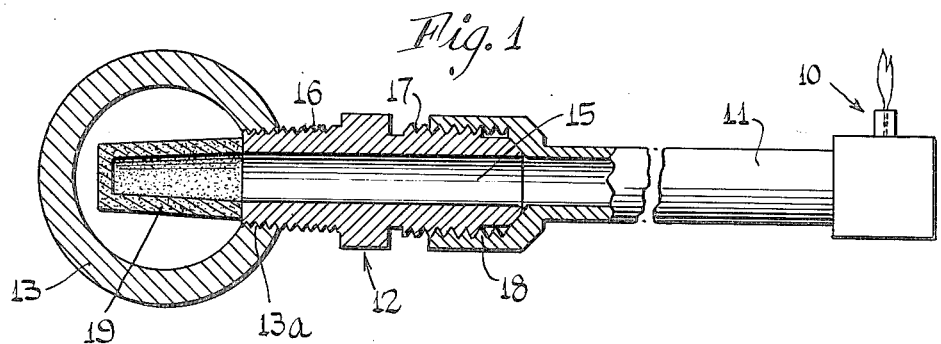
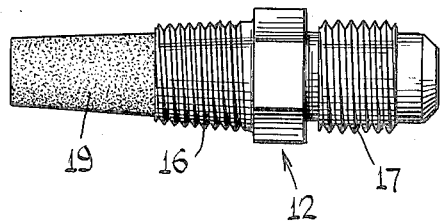
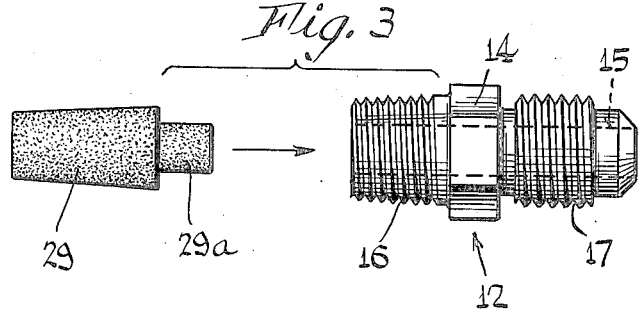
INVENTOR.
Charles W. Stewart
BY
Johnson and Kline
ATTORNEYS United States Patent Office 2,800,977
Patented July 30, 1957

2,800,977
DUST FILTER MEANS

Charles W. Stewart, Fairfield, Conn., assignor to Sprague Meter Company, Bridgeport, Conn., a corporation of Connecticut Application January 14, 1954, Serial No. 404,053

1 Claim. (Cl. 183—44)

This invention relates to filter means for pilot lights and more particularly to filter means adapted to be mounted on the means connecting the pilot light to a source of gas.

Heretofore, many service calls have been caused by small orifices in pilot lights and the like in appliances becoming blocked by dust. The dust usually is in the form of iron and silicon oxides.

Efforts have been made to eliminate this dust from the gas at control stations or in the supply lines leading to meters but these have not overcome the difficulty.

I have discovered that dust particles are continually being formed, particularly in undehydrated gas containing oxygen and sulphur-bearing impurities, after passing through the usual dust traps and as it passes to the customer's appliances having pilot lights and the like provided with small orifices.

The present invention overcomes the prior difficulties be removing from the gas immediately prior to the passage of the gas to the pilot light or the like such dust as would block the fine orifices.

This is accomplished by providing the fitting connecting the pilot light to the source of gas with a filter, preferably a rigid porous filter of any desired shape, adapted to remove dust particles greater than 3 microns in diameter from said gas. While the rigid porous filter can be made of ceramics or other similar filtering material, it is herein preferred to form the same of sintered metal, such as bronze, in a substantially conical shape.

In accordance with the present invention, the filter can be made integral with the fitting or can be formed as an attachement to be connected to the fitting in existing installations.

A feature of the invention resides in the fact that it can be easily installed either by removing the fitting normally connecting the pilot to the manifold and replacing the fitting with a fitting having a filter integrally connected thereto, or by providing the usual fitting with a filter member.

Other features and advantages of the invention will be apparent from the specification and claim when considered in connection with the drawings in which:

Figure 1 is a view partly in section of a pilot light connected to a gas manifold through a fitting having a filter of the present invention.

Fig. 2 is a side elevational view of the form of the invention shown in Fig. 1.

Fig. 3 shows a side elevational view of another form of the invention showing the filter being attached to a standard fitting.

The present invention while useful with any appliance having small orifices therein is herein illustrated as applied to a pilot light 10 having the usual small orifices therein carried by a mounting pipe 11 which is connected by a connector or fitting 12 to a gas manifold or source of supply 13.

The usual fitting, such as shown in Fig. 3, comprises a body 14 having a bore 15 therethrough and provided with external threads 16 at one end adapted to be threaded into a threaded hole 13a in the wall of the manifold and is provided at its other end with external threads 17 adapted to receive the threaded end 18 of the mounting pipe 11.

In accordance with the present invention a filter means for the pilot light is provided immediately adjacent the pilot light so that dust particles of iron or silicon oxide, which may have formed in the gas after the gas passed the usual protective dust traps in the line, will be removed before they can pass into the small orifices in the pilot light and block them. This is accomplished by providing the fitting with a filter 19 which is preferably a rigid filter of any suitable shape. While this filter may be made of ceramic or the like porous material, it is at present preferred to form it of sintered metal, such as bronze, with the sintering controlled so as to provide a porous body capable of preventing passage of dust particles greater than three microns in diameter to said pilot light.

In the form of the invention shown in Figs. 1 and 2, the fitting is provided with a substantially conical hollow filter having the base of the cone fused to the end of the fitting to overlie the end of the bore 15 so that dust particles will be removed from the gas as it passes from the manifold through the filter into the bore in the fitting and to the mounting pipe for the pilot light. This form of the invention is particularly well suited for original installation by the manufacturer in gas stoves and the like appliances. However, if desired, it may be also installed as a replacement unit for the standard fitting.

Under some circumstances it may be desirable to merely provide the standard fitting with a filter element. This is accomplished in the form of the invention shown in Fig. 3 wherein a filter unit 29 is provided. This unit has a neck 29a adapted to be inserted into the bore 15 of the fitting 12 to overlie the end thereof. The unit can be secured to the fitting by a friction fit of the neck in the bore or by suitable adhesives capable of holding the filter unit thereon, yet permitting the filter unit to be removed for cleaning or replacement as required. This form of the invention is particularly well suited for use in the field since the service man can merely supply the filter unit to the standard fitting already present in the appliance. It has a further advantage since it can be readily removed by the service man for replacement or cleaning.

Thus, it will be seen that the present invention provides a novel organization wherein a filter is provided immediately adjacent the pilot light or the like device having small orifices to remove therefrom such dust as would block up the orifices.

An advantage of the device of the present invention resides in the fact that it can be readily installed in new appliances or in existing appliances with a minimum of operations and at a minimum of cost.

Variations and modifications may be made within the scope of the claim and portions of the improvements may be used without others.

I claim:

A device for connecting a pilot light to a gas manifold comprising a straight tubular fitting having a bore therethrough and having exterior threads at one end adapted to be threaded into the manifold, exterior threads at the other end adapted to be connected to the pilot light, and an enlarged polygonal portion between said threaded ends adapted to receive a wrench; and a rigid porous filter secured to one end of the fitting and adapted to extend into the manifold, the pores of the filter being less than three microns in diameter whereby passage of dust particles greater than three microns in diameter to said pilot light is prevented.

References Cited in the file of this patent

UNITED STATES PATENTS

| | | |
|---|---|---|
| 881,483 | Olsen et al. | Mar. 10, 1908 |
| 1,963,526 | Morrow | June 19, 1934 |
| 2,220,641 | Davis | Nov. 5, 1940 |
| 2,377,549 | Gustafsson et al. | June 5, 1945 |